United States Patent [19]
Dezelan

[11] 3,866,627
[45] Feb. 18, 1975

[54] DUAL CHECK VALVE ARRANGEMENT

[75] Inventor: Joseph E. Dezelan, Joliet, Ill.

[73] Assignee: Caterpillar Tractor Co., Peoria, Ill.

[22] Filed: July 9, 1973

[21] Appl. No.: 377,300

Related U.S. Application Data

[62] Division of Ser. No. 264,961, June 21, 1972, Pat. No. 3,779,133.

[52] U.S. Cl............................. 137/512.5, 137/625.69
[51] Int. Cl............................................. F16k 15/02
[58] Field of Search...... 137/512.5, 512, 112, 513.3, 137/540

[56] References Cited
UNITED STATES PATENTS

| | | | |
|---|---|---|---|
| 1,958,155 | 5/1934 | Watkins | 137/512.5 |
| 2,138,988 | 12/1938 | Thomas | 137/512.5 X |
| 3,107,681 | 10/1963 | May | 137/512.5 X |
| 3,216,446 | 11/1965 | Schmiel | 137/512.5 X |
| 3,319,653 | 5/1967 | Stephens | 137/512.5 X |
| 3,661,422 | 5/1972 | Sember et al. | 137/612.1 |

Primary Examiner—William R. Cline
Attorney, Agent, or Firm—Phillips, Moore, Weissenberger, Lempio & Strabala

[57] ABSTRACT

A closed reservoir is connected to a pump for delivering pressurized hydraulic fluid to a directional control selector valve operatively connected to the ends of a double-acting hydraulic cylinder. A first check valve is positioned between the pump and the selector valve to pass pressurized hydraulic fluid thereby whereas a second check or make-up valve is telescopically mounted within the first check valve in exposed relationship to the hydraulic fluid contained in the reservoir. The make-up valve opens when the fluid pressure in the reservoir exceeds a predetermined level whereby such fluid is communicated therethrough and to the selector valve.

3 Claims, 2 Drawing Figures

DUAL CHECK VALVE ARRANGEMENT

This is a division of Ser. No. 264,961, filed June 21, 1972, now U.S. Pat. No. 3,779,133.

BACKGROUND OF THE INVENTION

Hydraulic control circuits for earthworking vehicles, such as tractors having hydraulically actuated work implements mounted thereon, oftentimes comprise a closed reservoir which may become ruptured when the fluid pressure therein exceeds a predetermined safe level. For example, such adverse condition may arise when a work implement is lowered by a hydraulic cylinder with the engine stopped. Hydraulic fluid exhausted to the reservoir from the cylinder becomes highly pressurized, particularly since a typical non-rotating engine driven pump is incapable of passing hydraulic fluid thereby. Applicant's assignee has substantially overcome such problem by mounting a directional control selector valve within the reservoir along with a check valve positioned between the pump and selector valve and a separate, make-up valve, exposed interiorly of the tank, to relieve such unduly high fluid pressures.

SUMMARY OF THE INVENTION

A primary object of this invention is to provide an improved hydraulic control circuit of the above type wherein the check and make-up valves define a passage means for communicating hydraulic fluid from the reservoir to the selector valve upon automatic opening of the make-up valve. In the preferred embodiment of this invention, the check valve and make-up valve, also comprising a check valve, are mounted in back-to-back relationship to define such passage means therethrough.

BRIEF DESCRIPTION OF THE DRAWING

Further objects of this invention will become apparent from the following description and accompanying drawing wherein.

DETAILED DESCRIPTION

Figure 1:
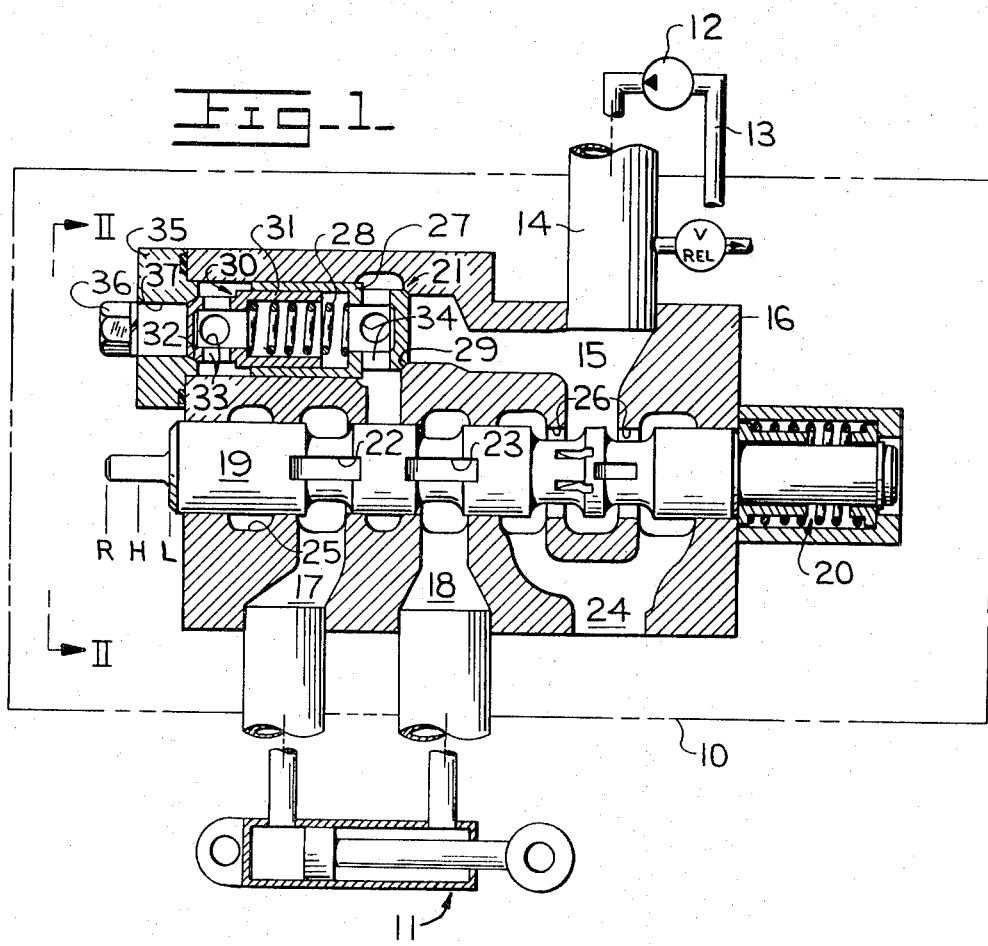
FIG. 1 schematically illustrates an improved hydraulic control circuit having selector, check and make-up valves of this invention suitably integrated therein.

FIG. 1 illustrates a hydraulic control circuit comprising a closed reservoir 10, shown in broken lines, adapted to be mounted on an earthworking vehicle such as a tractor. A hydraulic actuator 11, preferably comprising a double-acting hydraulic cylinder, is mounted on the tractor to perform a work function such as the selective raising or lowering of a ground engaging ripper (not shown). An engine driven pump means 12 communicates with the reservoir via a conduit 13 and with a directional control selector valve means via a conduit 14.

The selector valve means is mounted in the reservoir and is operatively connected to conduit 14 by first passage means 15, formed in a housing 16 thereof. Second passage means 17 and 18 are also formed in the housing to communicate the selector valve means with the head and rod ends of cylinder 11, respectively. The selector valve means further comprises a three-position valve spool 19 adapted to be manually positioned to either the lower (L), hold (H) or raise (R) position of cylinder operation.

The valve spool is normally and automatically maintained in its illustrated H position of operation by a conventional spring assembly 20, operatively associated with the right end thereof. Upon rightward movement of the valve spool to its L position, pressurized fluid from first passage means 15 will flow past a first check valve means 21, through a slot 22 and into a passage means 17 communicating with the head end of cylinder 11 to extend same. Simultaneously therewith, the rod end of the cylinder is exhausted via a passage means 18, a second slot 23 and an exhaust passage 24 communicating with the reservoir.

When the valve spool is moved leftwardly to its R position to retract the cylinder, the above sequence is reversed. In particular, pressurized fluid will communicate from first passage means 15, past check valve 21, through slot 23 and into passage means 18 to pressurize the rod end of cylinder 11. Simultaneously therewith, the head end of the cylinder will be exhausted via passage means 17, slot 22 and an annular chamber 25 which communicates with the reservoir. It should be noted that when the valve spool is maintained in its illustrated hold (H) position of operation, that annular passages 26 communicate pump 12 directly with the reservoir.

First check valve means 21 comprises a cup-shaped cylindrical member 27 normally urged rightwardly by a coil spring means 28 to have its closed end engage an annular seat 29 formed on the housing. A second check or make-up valve means 30 comprises a similar cup-shaped cylindrical member 31 telescopically mounted within member 27. Common spring means 28 also abuts member 31 to urge its closed end leftwardly against an annular seat 32 which is axially spaced from seat 29. Third passage means, preferably formed through the two back-to-back check valve means, comprises a plurality of apertures 33 formed at the reduced end of member 31, the cylindrical chambers formed within members 27 and 31 and apertures 34 formed at the reduced end of member 27.

Figure 2:
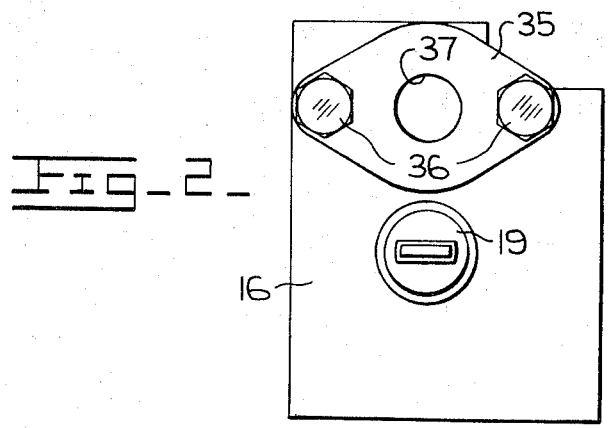
FIG. 2 is an end view of the valves, taken in the direction of arrows II—II in FIG. 1.

An end cover plate 35 of the housing, preferably having seat 32 formed thereon, is secured in place by cap screws 36 (FIG. 2). A centrally disposed opening 37 is formed through the plate to expose the closed end of member 31 to the fluid pressure level prevalent in the reservoir. When such level exceeds a predetermined amount, valve member 31 will move rightwardly to communicate fluid from the reservoir to the third passage means, formed through the two check valve means, and to the selector control valve means.

For example, it may be assumed that the engine (not shown) for driving pump 12 is not running and that selector valve spool 19 is moved to its L position to extend cylinder 11 to lower a ripper (not shown) attached thereto. In many conventional systems, lacking a valve corresponding to make-up valve means 30, the pressure in the reservoir may become unduly high to buckle or possibly rupture same. However, when such pressure level is exceeded in the FIG. 1 circuit, make-up valve means 30 will open automatically to communicate fluid from the tank to the selector valve means through opening 37 and apertures 33 and 34.

Such fluid will thus combine with any pressurized fluid which may be communicated to passage means 17 from first passage means 15, and past first check valve means 21. In addition to relieving unduly high pressures in the reservoir, any cavitation which would normally exist in the head end of cylinder 11 is substantially eliminated to permit the cylinder to function smoothly. It should be further noted that check valves 21 and 30 and plate 35 can be applied to conventional systems with only slight modification thereto.

What is claimed is:
1. A dual check valve arrangement comprising
a housing having walls defining a chamber having a pair of axially spaced annular seats therein,
a pair of inlet passages formed in the housing and extending through said seats,
outlet passage means formed in said housing at one of said annular seats,
first and second check valve means reciprocally mounted in said chamber in back-to-back relationship for independently opening and closing said inlet passages at said seats,
each of said first and second check valve means comprising a cylindrical cup-shaped member having a closed end thereof normally engaging a respective one of said seats to close off the associated inlet passage while leaving the annular seat in communication with the outlet passage means,
spring means mounted within said members for urging said cup-shaped members away from each other to engage said seats, and
internal passage means formed through said cup-shaped members and extending between said annular seats, said internal passage means being formed large enough to provide free fluid flow therethrough from the seat opposite the outlet passage to the seat adjacent said outlet passage.

2. The invention of claim 1 in which said housing comprises a cover plate detachably mounted thereon, said cover plate formed with one of said inlet passages and one of said seats, and being removable to expose an end of said second check valve means which engages said one of said seats.

3. The invention of claim 1 wherein said cylindrical cup-shaped members are telescopically mounted together, and said internal passage means comprises an internal chamber formed within each of said cup-shaped members, and at least one port in the side wall of each of said cup-shaped members near its adjacent valve seat.

* * * * *